Patented Mar. 6, 1923.

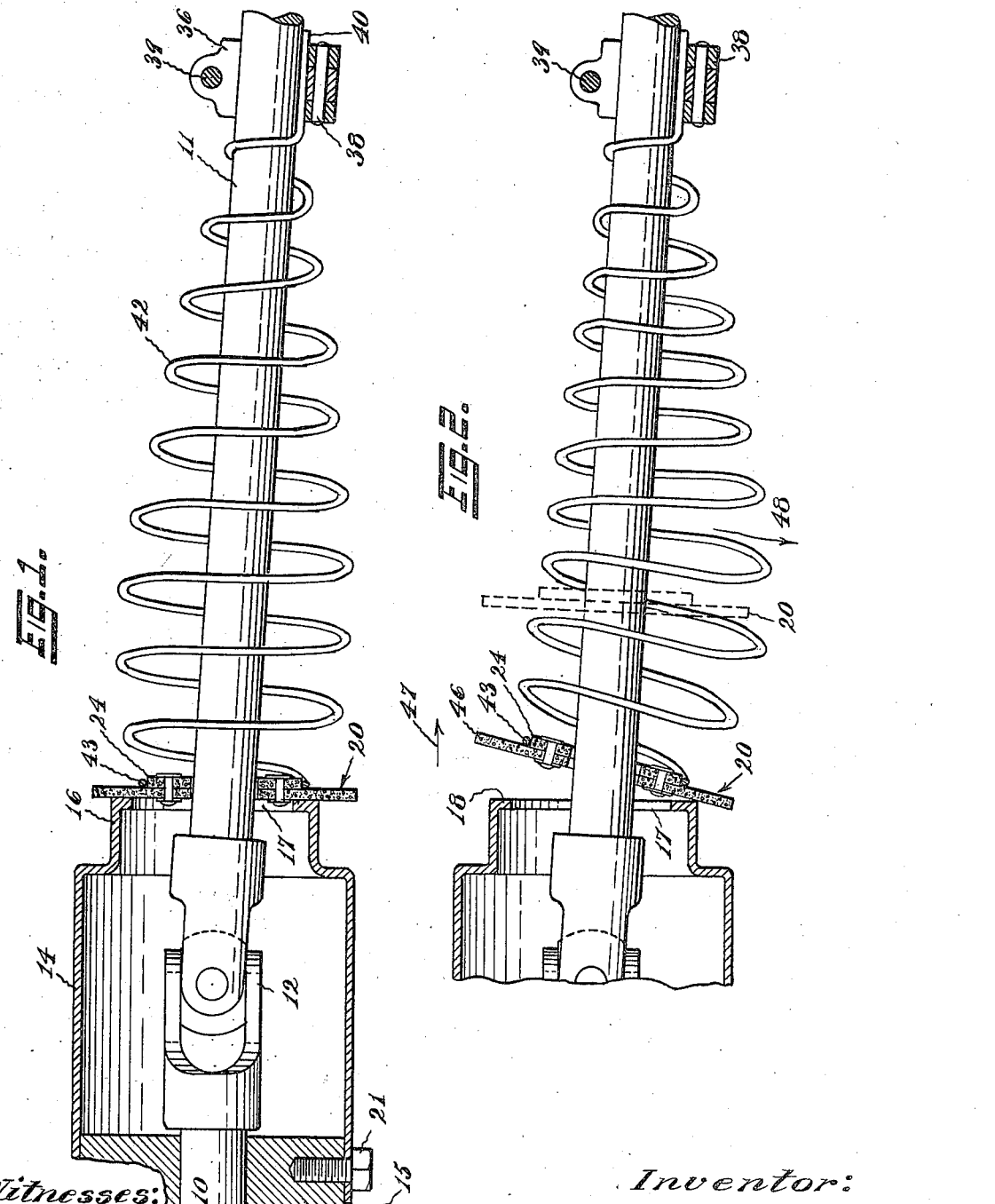
Mar. 6, 1923.
F. C. STANDISH.
UNIVERSAL JOINT CASING CLOSURE FOR TRANSMISSION SHAFTS.
FILED SEPT. 29, 1921.
1,447,492.
2 SHEETS—SHEET 1.
Inventor:
Floyd C. Standish,
By his Att'y, Mar. 6, 1923.　　　　　　　　　　　　　　　　　　　　　　1,447,492.
F. C. STANDISH.
UNIVERSAL JOINT CASING CLOSURE FOR TRANSMISSION SHAFTS.
FILED SEPT. 29, 1921.　　　　　　　　　　2 SHEETS—SHEET 2.
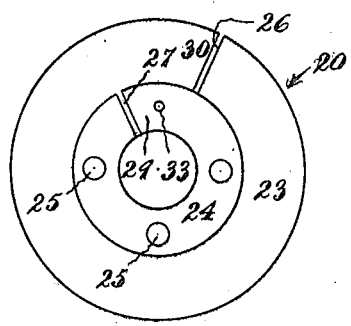
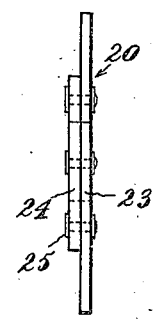
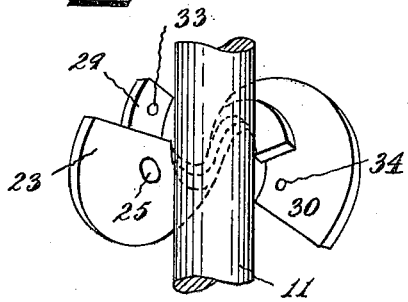
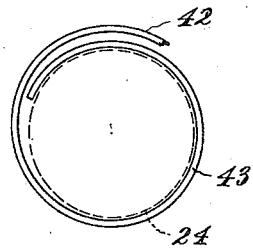
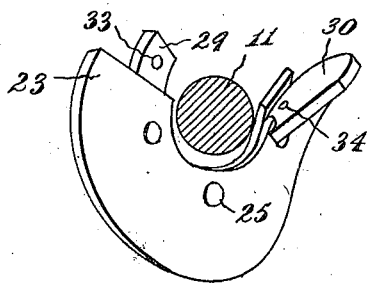
Witnesses:
L. C. Badeau
H. D. Penney
Inventor:
Floyd C. Standish,
By his Att'y, F. H. Richards.

1,447,492

UNITED STATES PATENT OFFICE.

FLOYD C. STANDISH, OF HARTFORD, CONNECTICUT.

UNIVERSAL-JOINT-CASING CLOSURE FOR TRANSMISSION SHAFTS.

Application filed September 29, 1921. Serial No. 504,081.

*To all whom it may concern:*

Be it known that I, FLOYD C. STANDISH, a citizen of the United States, residing in Hartford, in the county of Hartford and State of Connecticut, have invented certain new and useful Improvements in Universal-Joint-Casing Closures for Transmission Shafts, of which the following is a specification.

This invention relates to closing means for joint-casings for universal jointures, such for instance, as the universal joint between the main shaft and the Cardan shaft in the drive shaft of automobiles. However the invention is not limited to automobiles, or even to universal joints.

Heretofore, it has been customary to place over the universal joint, a metal casing which fits the main shaft and the Cardan shaft in a grease-tight fit, and the metal outer casing or dust cover being in the form of two spherical members nested together in the form of a ball joint in an attempt to give universal oscillating freedom to the Cardan shaft and at the same time keep the shaft practically dust proof. Inasmuch as this housing or casing has to be packed with heavy grease, it is very difficult on account of poor provisions made, for introducing heavy grease.

In addition it was heretofore customary to cover this metal grease housing with a leather cover which was laced or tied down over the main shaft on one side, and the Cardan shaft on the other, thus adding more difficulty to the proper care of the joint.

Objects of the present invention are to avoid the above disadvantages and to improve generally the simplicity and efficiency of such devices and to provide a device or apparatus of the kind stated in which very easy access may be had to the interior of the casing, as for cleaning or replacing the grease therein.

Another object of the invention is to provide in an apparatus or device of this kind an efficient arrangement whereby the cover is retained securely in place with practically no relative movement of parts when the alinement of the shafts is varied.

Another object of the invention is to provide for the easy assembling and disassembling of the spring and cover.

To accomplish the above objects I have provided on the end-to-end shaft members connected by the universal jointure, a casing carried by one of the members and having an end opening and a cover, and a spring received and secured on to the other member arranged so said spring presses the cover over said open end to close the latter.

Other objects of the invention will appear as the description proceeds; and while herein details of the invention are described, the invention is not limited to these, since many and various changes may be made without departing from the scope of the invention as claimed.

In the accompanying drawing, showing by way of example one of many possible embodiments of the invention.

Fig. 1 is a longitudinal vertical sectional view of the joint casing and cover, showing the other parts in elevation.

Fig. 2 is a longitudinal vertical sectional view similar to Fig. 1 showing the cover partly retracted;

Fig. 3 is a fragmental face elevation of the cover detached;

Fig. 4 is an edge elevation of the same;

Fig. 5 is a plan or side elevation of a fragment of the shaft showing the cover being placed thereon or removed;

Fig. 6 is an elevation similar to Fig. 5 except viewed longitudinally of the shaft, the shaft being shown in transverse section; and Fig. 7 is a fragmental elevation of the last convolution of the spring showing how it is adapted to grasp an element of the cover.

My improved joint-closing casing is shown in combination with a transmission shaft-line consisting of two shaft members 10 and 11 arranged end to end and connected by a universal jointure 12 whereby one of said members may rotate the other, and also whereby one of said members may have a variability of alinement relatively to the other during the rotation of the shaft line. While the invention is not so limited the shaft member 10 may comprise the usual main or driving shaft direct from the engine, of an automobile, the jointure 12 being the usual or customary universal joint, and shaft 11 the usual floating Cardan or transmision shaft which runs to the rear end of the differential (not shown) through which the rear driving wheels are actuated.

In the present instance, an improved form of dust-proof housing or casing 14 is provided carried by a collar 15 in turn carried fast on the shaft member 10, and it is to be understood that this casing may be made of any geometrical contour exteriorly, so long as it is provided at its rear end 16 with an opening 17 having an annular cover seat 18 (Fig. 2) in a plane transverse to the axis of said shaft member 10. This opening 17 is closed by means of a flexible cap or disk-form casing-cover 20 provided with an opening whereby it surrounds said shaft member 11 and normally in position for closing the jointure casing by bearing against said cover seat 18 thereof.

The forward end of this casing may be a tight fit on the collar 15, in turn a tight fit on the drive shaft thereby making this end leak-proof. The casing may be detached from the collar by removing the screw 21. Said cap or casing cover (Fig. 3) consists of split ring portions 23 and 24 secured together by rivets 25 and having the splits 26 and 27 staggered to form overlapping ends 29 and 30 for permitting the cover to be first de-formed (Fig. 5) and then re-formed (Fig. 3) to the extent required for the removal thereof from and the replacing thereof upon said shaft. When the ring portions are placed upon the shaft 11, they are held in place by a rivet passed through the holes 33 and 34.

At a predetermined distance on the Cardan shaft or shaft member 10 is located a split lock collar 36 which is so arranged as by the hinge joint 38 to be locked rigidly by a clamping screw 39 upon the Cardan shaft. Said split collar is formed as at the same time to grasp and firmly hold therein the straight end 40 of a resilient cover actuator which may be a coiled spring 42, the large end 43 of which is formed to embrace tightly the ring 24 and bears against the ring 23 of the disk 20. (See Fig. 7.)

Said spring 42 is appurtenant to the said second shaft member 11 in position and connected for normally exerting a continuous pressure against said cover disk 20 by a reaction against said second shaft member 11 thereby normally holding said cover disk against said cover seat 18 of the casing.

The spring 42 is sufficiently longitudinally compressible for permitting a retraction of said cover disk (to the position of the dotted lines of Fig. 2) for giving access to the jointure within the casing without the disassembling of any of the elements. In setting up this device the spring 42 is put under proper compression by locking the split collar 36 in a position that will keep said spring 42 under the desired compression to keep the cover 20 firmly against the seat 18 of the opening 17 in the casing 14.

When it is desired to pack or inspect the joint 12 the closure disk is merely pulled backward to the position of the dotted lines of Fig. 2 and the old grease removed and replaced with new.

One feature accomplished by the construction and arrangement of the shaft 11, casing cover 20 and spring 42 made with a diameter largely in excess of the diameter in the shaft, is to provide for a peculiar operation of the spring in holding the cover 20 in place, which operation is in the nature of a so-called "universal movement", this being analogous to that of a universal joint. Thus if one side, (for instance as the side 46 in Fig. 2) of the cover 20 be forcibly pushed away from the casing 14, in the direction of the arrow 47, then the adjacent coils of said spring 42 have a flexing action and are normally shifted out of alinement, about as indicated at arrow 48. Thus the spring when arranged as set forth has therein a mode of action whereby the cover 20 is normally pressed forward toward the seat 18 of the casing 14 and held firmly in that position except at such point in the periphery as may have been temporarily pulled back therefrom. Thus it will be seen that the spring (see Fig. 1) has the coils thereof lying normally in a circle, or geometric cylinder, having a diameter about midway of the shaft 11 and of said seat 18, and it appears that this construction and arrangement results, in practice, in an exceptionally perfect mode of action particularly when said disk 20 is made of flexible material,—such for instance as leather. The coil spring has a coiling proportional for the spring to be threaded or entwined onto and off from said shaft, the diameter and pitch of the convolutions being large enough for this purpose.

I claim:

1. A cup-closer apparatus for automobile grease cups of the class described, said closer comprising, in combination, a cup-closing closer-disk provided at its outer face with a raised portion forming an annular shoulder face; and, a resilient combined closer-disk-presser and carrier comprising three united members, first, a shaft-fitting attaching end, second, intermediate pusher-spring portion for pressing the closer-disk upon the cup; and, third, a resilient disk-shoulder-binding clamp diametrically expandible for receiving therein said annular shoulder-face of the cup-closer disk, whereby the disk and said clamp may be held releasably assembled, and whereby the closer-disk may be removed while the said clamp end of the closer-presser is only partially retracted away from the face of the grease cup, and thereby provide for the removal, replacing and renewal of the closer-disk without removing the closer-presser from the automobile shaft, substantially as set forth.

2. A cup-closer apparatus for automobile grease cups of the class described, comprising, in combination, a flexible lock-folded cup-closing closer-disk having an annular shoulder face and proportioned, when released from the carrier, for being out-folded into a temporary deformation by flexure and thereby to be made removable laterally from a shaft-member; and, a resilient combined closer-disk-presser and carrier comprising three united members, first, a shaft-fitting attaching end, second, an enlarged pusher-spring portion consisting of pliable coils; and, third, a resilient disk-shoulder-binding clamp for receiving therein said annular shoulder-face.

3. A cup-closer apparatus for automobile grease cups of the class described, comprising, in combination, a flexible lock-folded cup-closing closer-disk having an annular shoulder face; and, a resilient combined closer-disk-presser and carrier comprising three integrally united members; first, a shaft-fitting attaching end, second, an enlarged pusher-spring portion consisting of pliable coils proportioned for passing the shaft between them in the process of assembling and disassembling; and, third, a resilient disk-shoulder-binding clamp diametrically expandible for receiving therein said annular shoulder-face.

FLOYD C. STANDISH.

Witnesses:
H. M. KILPATRICK,
H. D. PAMEY.